United States Patent [19]

Iwasawa et al.

[11] 4,127,874
[45] Nov. 28, 1978

[54] APPARATUS FOR REMOVING GHOST SIGNALS FROM RECEIVED VIDEO SIGNALS

[75] Inventors: Mineo Iwasawa, Kanagawa; Tatsuo Sakaue, Yokohama; Hikaru Date, Fukuoka; Takehiro Takamatsu, Izumi, all of Japan

[73] Assignees: Tokyo Shibaura Electric Co., Ltd., Kawasaki; Nippon Hoso Kyokai, Tokyo, both of Japan

[21] Appl. No.: 800,893

[22] Filed: May 26, 1977

[30] Foreign Application Priority Data

May 27, 1976 [JP] Japan .............................. 51-67870[U]

[51] Int. Cl.$^2$ .......................... H04N 5/14; H04N 5/44
[52] U.S. Cl. .................................... 358/167; 358/905; 328/167; 325/476
[58] Field of Search ............... 358/167, 187, 188, 905; 325/475, 476, 65; 328/165, 167; 330/70 T, 18, 17 R; 179/170.2, 170.8

[56] References Cited

U.S. PATENT DOCUMENTS

| 3,480,867 | 11/1969 | Sichak | 325/476 |
| 3,588,385 | 6/1971 | Moye | 179/170.2 |
| 4,044,381 | 8/1977 | Shimano et al. | 358/188 |

Primary Examiner—John C. Martin
Attorney, Agent, or Firm—Oblon, Fisher, Spivak, McClelland & Maier

[57] ABSTRACT

A feedback type ghost killer removes a ghost signal component from a detected composite video signal including a wanted video signal and the unwanted ghost signal. The delay time and relative amplitude of the ghost signal to the wanted video signal are detected by a detector with a plurality of tapped outputs. When an output signal appears on one of tapped outputs, the tap position represents the delay time and the amplitude of the output signal indicates the relative amplitude. The composite video signal and the output signals of the detector are supplied to a transversal filter to form a pseudo-ghost signal. The tapped outputs of the detector are used to weight the video signal in the transversal filter. The pseudo-ghost signal and the video signal are subtractively combined to remove the ghost signal from the video signal.

16 Claims, 13 Drawing Figures

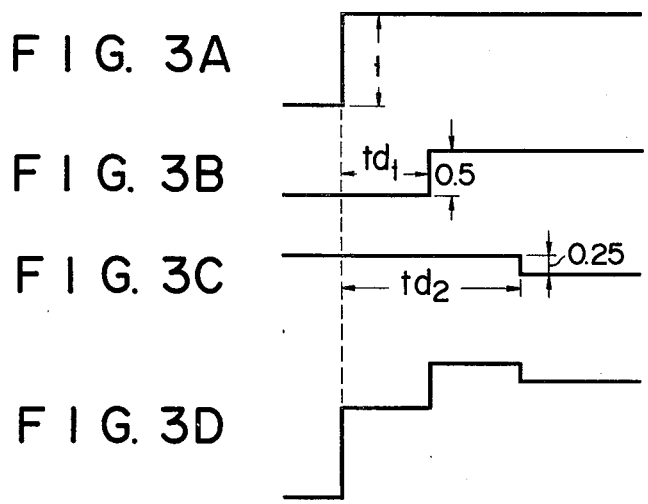
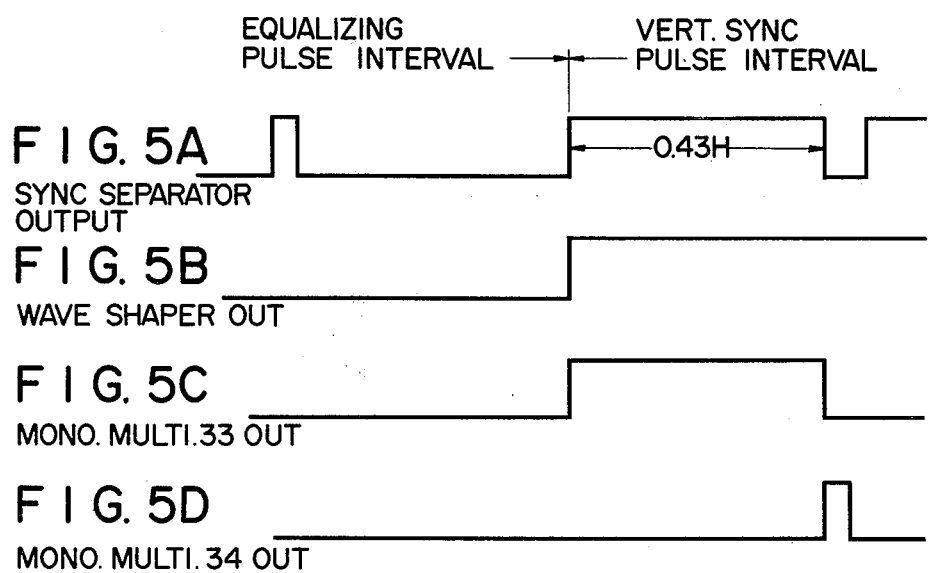

APPARATUS FOR REMOVING GHOST SIGNALS FROM RECEIVED VIDEO SIGNALS

BACKGROUND OF THE INVENTION

The present invention relates to an apparatus for removing an unwanted signal from an incoming signal including a wanted signal and the unwanted signal which is the time-delayed wanted signal with a modified amplitude.

For example, the television signal, i.e. the composite video signal, received often includes the wanted video signal and the ghost signal which is delayed from the wanted video signal and has changed amplitude. Ghost trouble of television reception in city area being increased in high buildings, becomes more complicated, enlarging the trouble suffering area. A receiving antenna with a keen directivity can solve such the ghost trouble, along with a high disadvantage and difficulty of its fitting. The signal processing way at the video intermediate frequency amplifier stage which also successfully eliminates the trouble, suffers from complexity of the circuit construction because of necessity of control of the phase of the intermediate frequency carrier.

SUMMARY OF THE INVENTION

Accordingly, an object of the present invention is to provide an unwanted signal removing apparatus with a relatively simple construction.

Another object of the present invention is to provide an apparatus for automatically removing the ghost signal from the detected composite video signal.

Still another object of the present invention is to provide an apparatus for automatically removing the ghost signal from the detected composite video signal, by using a transversal filter adaptable for integrated circuit.

An unwanted signal removing apparatus according to the present invention will be briefed. An unwanted signal, e.g. the ghost signal in the composite video signal, has a time-delay and a modified amplitude. The time delay and the modified amplitude of the ghost signal relative to the wanted signal are detected by a ghost detector connected to the output of an amplifier for a detected composite video signal and having tapped outputs. When a ghost signal exists, the relative amplitude and delay time of it relative to the wanted signal are represented by the signal level of a signal appearing at a tapped output and the position of the tapped output having such a signal, respectively. An input-weighted or output-weighted transversal filter receives a video signal including the ghost signal and the tapped output signals of the ghost detector for the purpose of weighting the video signal to form pseudo-ghost isgnal.

In order to detect the ghost signal, it is preferable to use a unit step-like signal included in the composite video signal transmitted. The apparatus of the invention uses the first individual pulse in the serrated vertical sync pulse consisting of six individual pulses each having the duration of about 27 $\mu$s succeeding to the equalizing pulses during a vertical blanking period in the composite video signal. When the ghost is included, the amplitude of the synchronizing signal varies with time during the pulse duration. The first pulse in the vertical sync pulse interval is sampled by the frequency three times the color sub-carrier frequency of about 10.7 MHz, for example. The level of the $n$-th sample is compared with that of the $n+1$-th one. The $n$ represents integer, $n = 1, 2, \ldots$ . For the video signal with no ghost included, both the samples are equal in level. When these samples have different levels, the tapped output corresponding to the sampling section of the $n+1$-th has an output level which represents the relative amplitude of the ghost signal to the unit step signal and equals the difference between two samples. The tapped output signal provides the information of the delay time and relative amplitude of the ghost signal. The delay time and relative amplitude of the ghost signal to the unit step signal are equal to those to the video signal. Therefore, a transversal filter which is driven by the sampling frequency for the unit step like signal can produce only the ghost signal when the video signal and the weighting signals from the ghost detector are applied to the transversal filter.

In the apparatus of the invention, integrators are inserted between the tapped outputs of the ghost detector and the weighting circuit inputs of the transversal filter for improving the S/N ratio. The provision of the integrators ensures an excellent ghost removal function even in a weak electric field area.

The invention enables a ghost detector including a CCD analogue shift register and analogue switches, and a CCD transversal filter to be integrated into a single chip, thus providing a low cost and small size ghost killer.

The ghost killer of the invention can remove the ghosts with the delay time up to about 27 $\mu$s.

Other objects and features of the invention will be apparent from the following description taken in connection with the accompanying drawings, in which:

BRIEF DESCRIPTION OF THE DRAWING

FIGS. 3A to 3D illustrate the relationship between the unit step-like signal and ghosts, these being included in the composite video signal;

FIGS. 5A to 5D show a set of timing diagrams for illustrating the operation of the FIG. 4 circuit;

DESCRIPTION OF THE PREFERRED EMBODIMENTS

Figure 1:
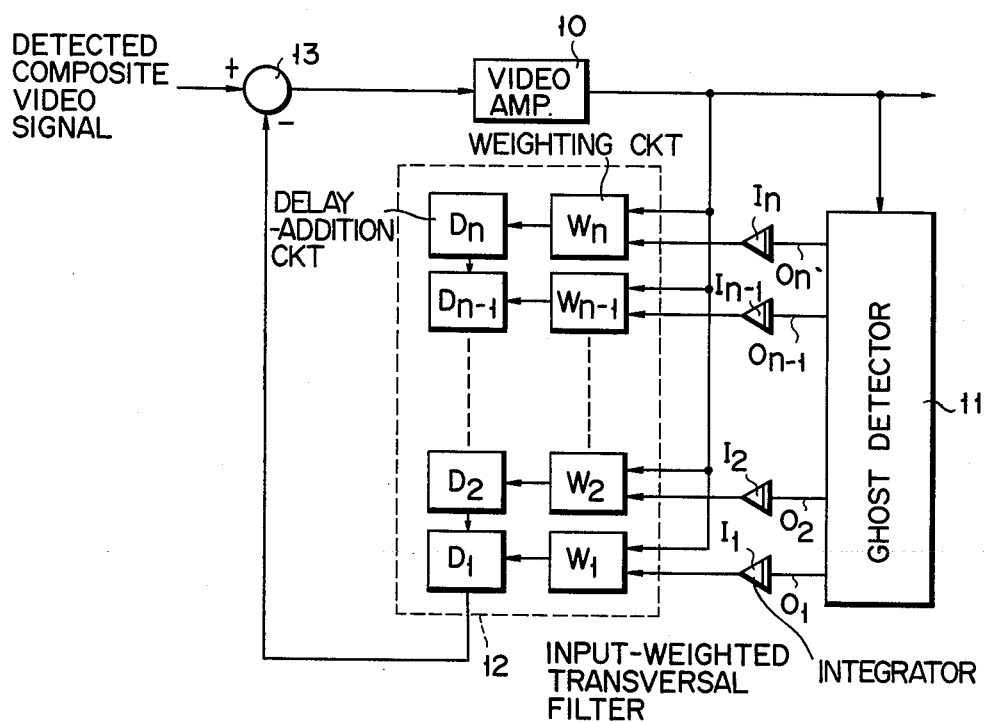
FIG. 1 shows a block diagram of a ghost killer embodying the invention.

Reference will now be made to FIG. 1 illustrating a feed back type ghost killer in accordance with the invention. As shown, a unity gain video amplifier 10 for a composite video signal from a video detector (not shown) is coupled at the output with a ghost detector 11 having tapped outputs $O_1$ to $O_n$ and a transversal filter 12.

As will be described in detail later, the ghost detector 11 is so arranged as to detect the delay time and relative amplitude of the ghost to a wanted signal on the basis of a selected synchronizing pulse during a vertical blanking period. When the ghost is included in the composite video signal, the amplitude of the synchronizing pulse varies with time for its pulse duration. In view of this fact, the ghost detector 11 operates: the selected synchronizing pulse is sampled with a given sampling frequency; the amplitudes of the $m$-th and $m+1$-th samples are compared where $m = 1, 2, 3, \ldots$; and through the comparison, the time delay and amplitude of the ghost are given at the tapped outputs of the detector. The amplitude of the ghost is represented by the amplitude of the signal appearing on one of the tapped outputs and the delay time by the position of the tapped output having the signal. The respective tapped outputs have predetermined time relation with respect to the leading edge of the corresponding synchronizing pulse to be sampled. The time interval between adjacent two tapped outputs O$m$ and O$m+1$ euqals to the signal sampling period, and the time interval from the leading edge of the tapped output O$m$ is shorter than that of the O$m+1$.

The transversal filter 12 shown in FIG. 1 is depicted in the form of an input-weighted transversal filter in which an input signal is weighted before it enters the delay network. This type filter is disclosed in U.S. patent application Ser. No. 681,700, filed Apr. 29, 1976. The input-weighted transversal filter 12 includes weighting circuits W1 to W$n$ to which the composite video signal is supplied from the video amplifier 10 and cascade-connected delay circuits D1 to D$n$. The respective delay circuits have a delay function for providing the delay time equal to the sampling period to the input signal and an addition function. For this, the delay circuits are connected so that they each receive an output signal from the immediately preceding stage thereof and the output signal from the corresponding weighting circuit. To the respective weighting circuits W1 to W$n$, the tapped outputs O1 to O$n$ from the ghost detector 11 are coupled for weighting the video signal. The respective weighting circuits are so arranged that, when no output signal appears on the corresponding tapped outputs, the input video signal is not applied to the delay network. Preferably, integrators I1 to I$n$ are connected between the tapped outputs O1 to O$n$ and the weighting circuits W1 to W$n$.

The time delay and the relative amplitude of the ghost synchronizing pulse to the synchronizing pulse are equal to those of the ghost video signal to the video signal. Therefore, application of the weighting signals from the ghost detector and the video signal to the transversal filter can produce a pseudo-ghost signal of the video signal. The pseudo-ghost signal is applied to a substractor 13 placed at the input side of the video amplifier 10 where only the ghost signal is subtracted from the video signal.

For example, when a signal appears on the tapped output O$n$-1, the video signal accompanied by the ghost is controlled in amplitude by the weighting circuit W$n$-1 to have the amplitude equal to that of the ghost signal. The video signal with such an amplitude is applied to the delay circuit D$n$-1. At the moment the ghost signal is applied to the subtractor 13, the amplitude-controlled video signal is applied to the subtractor 13 through the delay circuits D$n$-1 to D1. In this manner, the ghost is cancelled or deleted in the subtractor 13.

Figure 2:
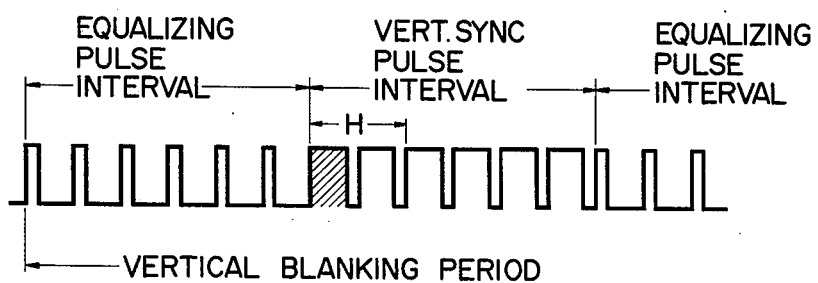
FIG. 2 illustrates a train of synchronizing pulses during a vertical blanking period of the composite video signal, one of which may be used for detecting ghosts.

Turning now to FIG. 2, there are shown synchronizing pulses in a vertical blanking period used for detecting the ghost. The ghost detection signal of the invention is the first pulse included in the vertical sync pulse interval succeeding to the equalizing pulse interval during the vertical blanking period. The first pulse is shaded in FIG. 2 and has the duration of 27.30 $\mu$s which is 0.43 times a horizontal line time H of 63.5 $\mu$s. As shown in FIG. 3, assume now that a unit-step like signal such as the shaded pulse in FIG. 2 has the amplitude of "1", as shown in FIG. 3A, and is accompanied by a positive ghost signal (FIG. 3B) delayed $td1$ and with the amplitude of 0.5 and a negative ghost (FIG. 3C) delayed $td2$ and with the amplitude of 0.25. The amplitude of the synthesized unit-step like signal varies with time as shown in FIG. 3D. Therefore, if such the pulse with the amplitude varying with time is sampled and the signal levels of samples are compared, the delay time and relative amplitude of the ghost may be detected. In this example, the synchronizing pulse is sampled by the frequency 10.7 MHz three times as large as the color sub-carrier frequency and which is much higher than the maximum frequency of the video signal. With use of the pulse having the 27.3 $\mu$s duration, this example can remove ghosts delayed up to 27 $\mu$s.

Figure 4:
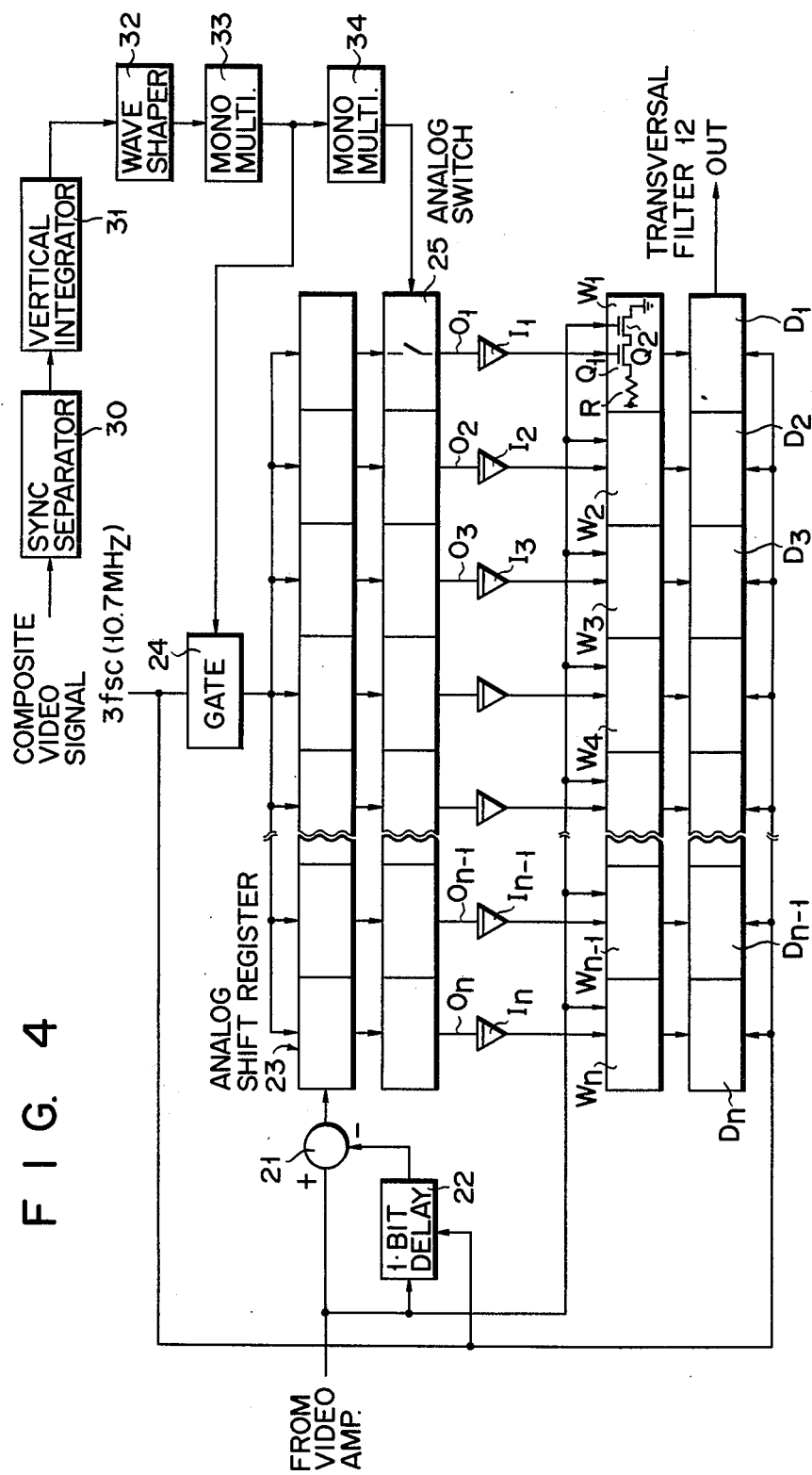
FIG. 4 shows in block form the details of the ghost detector and the transversal filter in the FIG. 1 ghost killer.

FIG. 4 will be referred to for detailed description of the ghost detector 11 and a transversal filter 12. As shown in the figure, an output signal from the video amplifier 10 is applied to the plus (+) terminal of a subtractor 21 and the minus (−) terminal of the same through a 1-bit delay circuit 22. The 1-bit delay circuit 22 is driven by clock signals of $3f_{sc}$ (10.7 MHz) and delays the input signal about 0.09 $\mu$s (1/10.7 MHz). In this way, the input signal is smapled by the frequency of $3f_{sc}$ and the amplitudes of adjacent samples are compared. The output signal of the subtractor 21 is clocked into an analogue shift register or analogue delay line 23 which is driven by the clock pulses $3f_{sc}$ fed through a gate 24. The gate circuit 24 is enabled 60 times per second in response to the incoming of the first pulse of individual ones in the vertical sync pulse interval during the vertical blanking period. During the enabling duration of the gate 24, the analogue output signal of the subtractor 21 is sampled by the $3f_{sc}$ clock signal and clocked into the analogue shift register 23. The number of stages of the analogue shift register 23 depends on the clock frequency $3f_{sc}$ and the duration 0.43 H of the pulse to be sampled. In this example, the stage number may be 293 ($3f_{sc} \times 0.43$H) at the maximum, for example, even if the 1-bit delay 22 is included. To the respective stages of the shift register connected are corresponding analogue switches 25 the outputs of which are in trun connected to the integrators. After enabling of the gate 24, the analogue switches 25 are enabled for a predetermined time period, permitting the output signals at the respective stages of the shift register 23 to enter the corresponding integrators $I_1$ to $I_n$.

The gate circuit 24 and the analogue switches 25 will be controlled in the following manner. The composite video signal is fed to a known sync separator 30 to take out only the sync pulse as shown in FIG. 5A. The sync pulse taken out is then transferred to a vertical integrator 31 and a wave shaper 22 to form an output pulse as shown in FIG. 5B. The output pulse from the wave shaper 32 triggers a monostable multivibrator 33 to produce a pulse with the duration of about 0.43 H as shown in FIG. 5C. The duration of the output pulse from the multivibrator 33 may be determined by the number of stages of the shift register which also determines the maximum delay time of the ghost removable. The output of the multivibrator 33 is applied to the gate circuit 24 to enable it, and also is applied to another monostable multivibrator 34. The multivibrator 34 is triggered at the negative transition of the output pulse of the multivibrator 34 to form a pulse as shown in FIG. 5D for enabling the analoque switch 25. Together with the video signal from the video amplifier 10, the outputs of the intergrators $I_1$ to $I_n$ are applied to the corresponding weighting circuits $W_1$ to $W_n$ of the transversal filter 12. Each weighting circuit includes a load resistor R and MOS FET's $Q_1$ and $Q_2$ which are connected in series across a power supply. The FET $Q_1$ is connected at the gate electrode to the corresponding integrator and the FET $Q_2$ at the gate to the video signal. A delay circuit is coupled with the connection point between the load resistor R and the FET $Q_1$. The delay network $D_1$ to $D_n$ is driven by the $3f_{sc}$ clock signal, as in the case of the analogue shift register 23, and each delay circuit has a delay function of about 0.09 $\mu$s, like each stage of the shift register 23.

The analogue shift register 23 operates to receive an output signal from the subtractor 21 every field time, through the operation of the gate 24. Therefore, each of integrators $I_1$ to $I_n$ receives an analogue signal once per field time from the corresponding stage of the shift register 23 through the corresponding analogue switch.

In this example, an integration time constant that the output signal level of the integrator reaches the input signal level is selected relatively large, for example, 60-field time (1 second). In other words, the output signal level of the integrator equals the input one when the integrator receives 60 input signals at the rate of once per field time. This means that the transversal filter does not produce a pseudo-ghost signal for substatially deleting the ghost included in the composite video signal until 60-field time lapses. For this, the ghost removal operation is delayed somewhat. With such minor disadvantage, the integrators are employed for relieving the random noises included in the composite signal to improve the signal to noise ratio of automatic gain control signals or weighting signals for the video signal from the ghost detector to the transversal filter. The X/N ratio for the integration time constant of 60-field time is improved about 18 dB, compared to that for 1-field time. This means that a good ghost killer operation is ensured even in weak electric field areas. The use of the integrators further eliminates erronous operation of the ghost killer due to sudden external noises.

Figure 7:
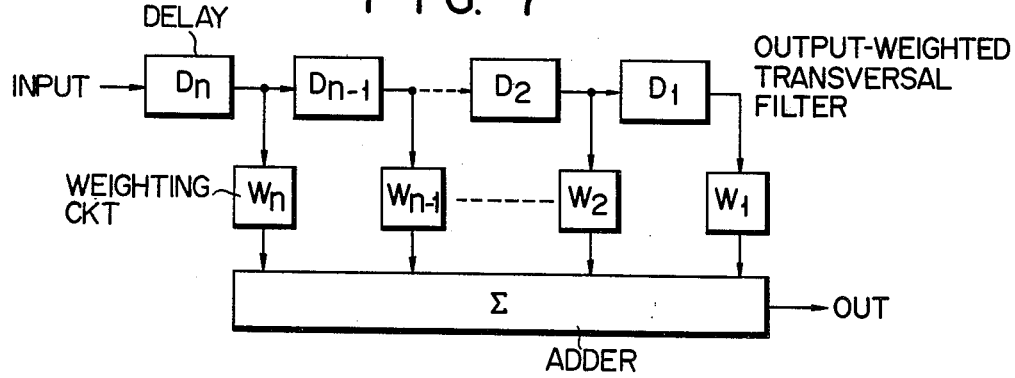
FIG. 7 shows another example of the transversal filter which is applicable to the present invention.

At least these circuitries, i.e. the subtractor 21, the 1-bit delay circuit 22, the analogue shift register 23, the analogue switches 25, the integrators $I_1$ to $I_n$, and the transversal filter 12, may be integrated into a single semiconductor chip. Charge transfer devices such as charge coupled devices or bucket brigade devices may be used for the 1-bit delay circuit 22, the analogue shift register 23, and the transversal filter 12. The output-weighted transversal filter as shown in FIG. 7 may also be used for the transversal filter.

Figure 6:
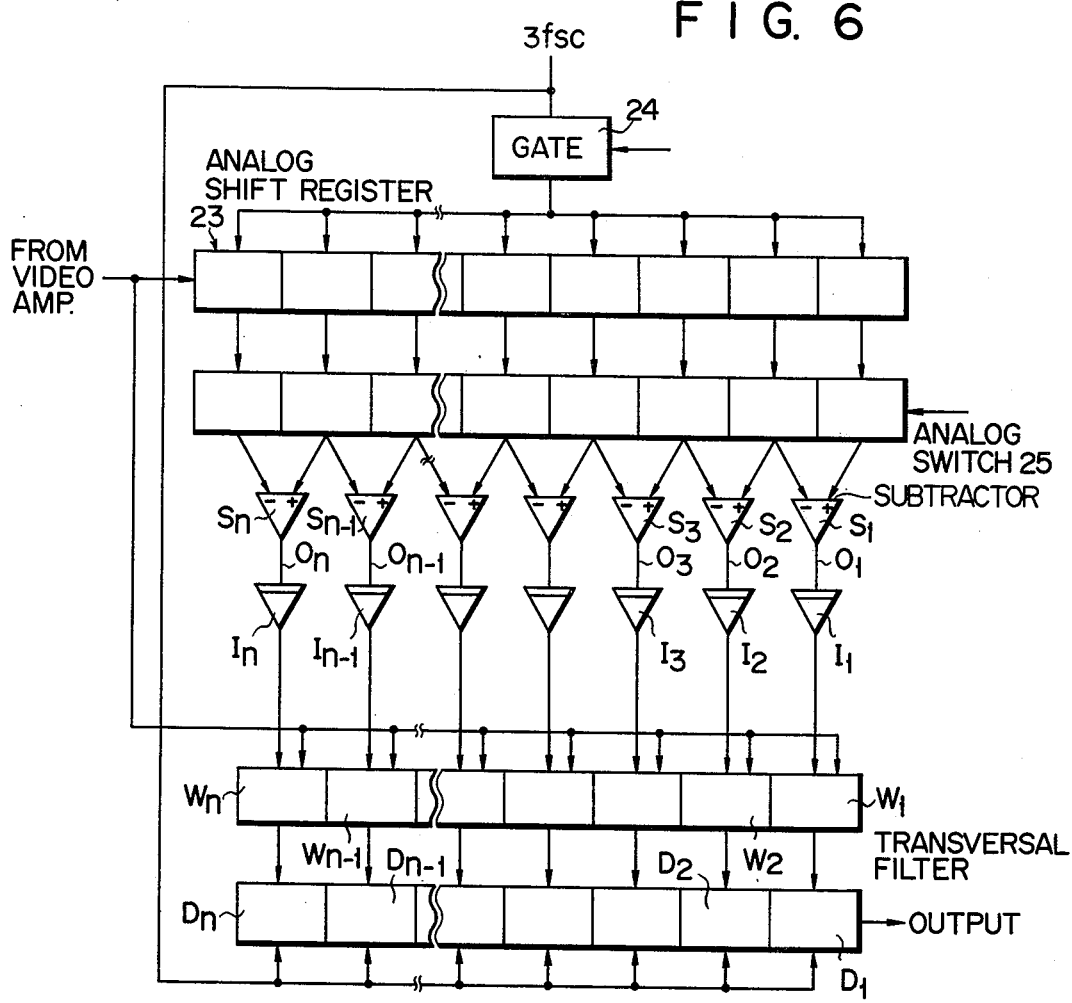
FIG. 6 is a modification of the FIG. 4 circuit.

Referring to FIG. 6, there is shown a modification of FIG. 4, in which like numerals are used to designate like portions in FIG. 4, thus omitting the description of details of the corresponding portions. In this example, an output signal from the video amplifier 10 is sampled by the $3f_{sc}$ clock signal and clocked into the analogue shift register 23. The comparison between the adjacent samples are made by subtractors $S_1$ to $S_n$ each connected to outputs of adjacent analogue switches 25. Therefore, an additional stage and switch are needed for the analogue shift register 23 and the analogue switches 25 compared to the FIG. 4 circuit.

In FIGS. 4 and 6 embodiments, the operation of analogue shift register is limited within the duration of a given pulse in the vertical blanking period, by controlling the supply of shift pulses to the analogue shift register 23 by using the gate circuit 24. With provision of the gate circuit 24 at the input side of the analogue shift register 23, the supply of input signal to the shift register may be performed during the duration of the pulse to be sampled. Alternatively, the analogue switch 25 may be constructed so as to be enabled for the duration of the pulse to be sampled.

What we claim is:

1. An apparatus for removing an unwanted signal from an incoming signal including a wanted signal and the wanted signal which is the time-delayed wanted signal with a modified amplitude, comprising:

an amplifier for the incoming signal;

detector means coupled to the output of said amplifier and having a plurality of tapped outputs for detecting the time delay and relative amplitude of the unwanted signal to the wanted signal, said detector means being so arranged that, when a signal appears on one of said tapped outputs, the tap position represents the time delay of the unwanted signal to the wanted signal and the amplitude thereof represents the relative amplitude of the unwanted signal to the wanted signal;

transversal filter means connected with the output of said amplifier and the tapped outputs of said detector means for producing a pseudo-unwanted signal substantially equivalent to the unwanted signal; and subtractor means connected at the output thereof to the input of said amplifier for combining subtractively the pseudo-unwanted signal from said transversal filter means and said incoming signal.

2. An apparatus according to claim 1, in which said transversal filter means includes an input-weighted transversal filter.

3. An apparatus according to claim 1, in which said transversal filter means includes an output-weighted transversal filter.

4. An apparatus according to claim 1, in which said amplifier has a unity gain.

5. An apparatus for removing an unwanted ghost video signal from detected composite video signal including a wanted video signal and the unwanted ghost video signal, comprising:

an amplifier for the detected composite video signal;

detector means coupled to the output of said amplifier and having a plurality of tapped outputs for detecting the time delay and relative amplitude of the ghost video signal to the wanted video signal, said detector means being so arranged that, when a signal appears on one of said tapped outputs, the tap position represents the time delay of the ghost signal to the wanted video signal and the amplitude thereof represents the relative amplitude of the ghost signal to the wanted video signal;

transversal filter means connected with the output of said amplifier and the tapped outputs of said detector means for producing a pseudo-unwanted ghost video signal substantially equivalent to the unwanted ghost video signal; and subtractor means connected at the output thereof to the input of said amplifier for combining subtractively the pseudo-ghost signal from said transversal filter means and said composited video signal.

6. An apparatus according to claim 5, in which said transversal filter means includes an input-weighted transversal filter.

7. An apparatus according to claim 5, in which said transversal filter means includes an output-weighted transversal filter.

8. An amplifier according to claim 5, in which said amplifier has a unity gain.

9. An apparatus for removing an unwanted ghost video signal from a detected composite video signal including a wanted video signal and the unwanted ghost video signal, comprising:
an amplifier for the detected composite video signal;
detector means coupled to the output of said amplifier and having a plurality of tapped outputs for detecting the time delay and relative amplitude of the ghost signal to the wanted video signal, said detecting means being so arranged to sample the first synchronizing pulse in the vertical synchronizing pulse interval succeeding to the equalizing pulse interval during a vertical blanking period of the composite video signal by a given sampling frequency and compare the amplitudes of adjacent two samples, whereby, when a signal appears on one of the tapped outputs, the information of the time delay and relative amplitude of the ghost signal are given by the position of the tapped output on which the signal appears and the amplitude of the signal on the tapped output;
a plurality of integrator means coupled with said tapped outputs of said detector means;
transversal filter means coupled with the output of said amplifier and the outputs of said integrator means to produce a pseudo-ghost signal substantially equivalent to said ghost signal; and
subtractor means connected at the output thereof to the input of said amplifier for subtractively combining said pseudo-ghost signal from said transversal filter means and the detected composite video signal.

10. An apparatus according to claim 9, in which said transversal filter includes an input-weighted transversal filter.

11. An apparatus according to claim 9, in which said transversal filter means includes an output-weighted transversal filter.

12. An apparatus according to claim 9, in which each of said integrator means has the integrating time constant corresponding to about 60-field time of the composite video signal.

13. An apparatus according to claim 9, in which said sampling frequency is three times the color sub-carrier frequency.

14. An apparatus according to claim 9, in which said detector means includes delay means for delaying the detected composite video signal by the time equal to said sampling period, subtracting means for subtractively combining the output of said delay means and the detected composite video signal, analogue shift register means connected to the output of said subtractor means and having a plurality of tapped outputs, an a plurality of analogue switches connected to said tapped outputs of said analogue shift register.

15. An apparatus according to claim 9, in which said detector means includes analogue shift register means coupled with the output of said amplifier and having a plurality of tapped outputs, analogue switch means having a plurality of stages and coupled with said tapped outputs of said analogue shift register means, and a plurality of subtractor means for subtractively combining the outputs of adjacent stages of said analogue switches.

16. An apparatus according to claim 9, in which said amplifier has a unit gain.

* * * * *

UNITED STATES PATENT AND TRADEMARK OFFICE
CERTIFICATE OF CORRECTION

PATENT NO. : 4,127,874
DATED : November 28, 1978
INVENTOR(S) : Mineo Iwasawa et al It is certified that error appears in the above-identified patent and that said Letters Patent are hereby corrected as shown below:

Claim 1, Column 6, line 10, "wanted" (first occurrence) should be corrected to --unwanted--.

Signed and Sealed this

Twenty-ninth Day of May 1979

[SEAL]

Attest:

RUTH C. MASON
Attesting Officer

DONALD W. BANNER
Commissioner of Patents and Trademarks